United States Patent
Hopp (10) Patent No.: US 9,170,093 B2
(45) Date of Patent: Oct. 27, 2015

(54) DEVICE FOR MEASURING THE RELATIVE POSITION OF TWO OBJECTS MOVING IN RELATION TO EACH OTHER

(71) Applicant: SICK STEGMANN GmbH, Donaueschingen (DE)

(72) Inventor: David Hopp, Donaueschingen (DE)

(73) Assignee: SICK STEGMANN GMBH, Donaueschingen (DE)

( * ) Notice: Subject to any disclaimer, the term of this patent is extended or adjusted under 35 U.S.C. 154(b) by 187 days.

(21) Appl. No.: 14/014,667

(22) Filed: Aug. 30, 2013

(65) Prior Publication Data

US 2014/0092396 A1 Apr. 3, 2014

(30) Foreign Application Priority Data

Sep. 28, 2012 (EP) ...................................... 12186630

(51) Int. Cl.
*G01B 11/14* (2006.01)
*G01J 4/00* (2006.01)
*G01D 5/34* (2006.01)
(52) U.S. Cl.
CPC ................ *G01B 11/14* (2013.01); *G01D 5/345* (2013.01); *G01J 4/00* (2013.01)
(58) Field of Classification Search
CPC .. G01B 11/14; G01B 11/168; G01B 2290/70; G01B 11/026; G01B 11/245; G01D 5/345; G01J 4/00; G01J 9/00; G02B 27/28; G02B 27/288; G02B 6/2766
USPC ...................... 356/237.1–241.6, 242.1–243.8, 356/426–431, 600–640
See application file for complete search history.

(56) References Cited

U.S. PATENT DOCUMENTS

| | | | | |
|---|---|---|---|---|
| 2,651,771 | A | * | 9/1953 | Palmer ..................... 340/870.29 |
| 2,700,918 | A | * | 2/1955 | Osterberg et al. ............. 359/371 |
| 3,306,159 | A | * | 2/1967 | Beall, Jr. et al. ............... 250/225 |
| 3,397,608 | A | * | 8/1968 | Ellis .............................. 356/367 |
| 3,474,255 | A | * | 10/1969 | White ........................... 250/225 |
| 3,604,811 | A | * | 9/1971 | McMenmin ............. 250/231.13 |
| 3,938,890 | A | * | 2/1976 | Flavell .......................... 356/370 |
| 3,981,587 | A | * | 9/1976 | Gievers ...................... 356/141.3 |
| 4,560,272 | A | * | 12/1985 | Harris ........................... 356/138 |
| 4,650,996 | A | * | 3/1987 | Maehara et al. ......... 250/231.14 |
| 5,424,535 | A | * | 6/1995 | Albion et al. ................. 250/225 |

(Continued)

FOREIGN PATENT DOCUMENTS

FR 2868528 A1 10/2005
JP 61097521 A 5/1986

*Primary Examiner* — Gregory J Toatley
*Assistant Examiner* — Jarreas C Underwood
(74) *Attorney, Agent, or Firm* — Nath, Goldberg & Meyer; Jerald L. Meyer; Rury L. Grishham (57) ABSTRACT

The invention relates to a device for measuring the relative position of two objects moving relative to each other along an axis or around a rotating axis (D), with a transmitter (12) which emits unpolarized light, and with a polarizer (20), and with at least one receiver (16) which measures the luminosity of the light passing through the polarizer (20) in order to create a position-dependent signal, such that a polarizing filter is positioned in front of the receiver (16), and the receiver (16) and the polarizer (20) move relative to each other as a function of the relative position of the two objects, and such that the polarizer (20) has at least two different polarizing directions.

14 Claims, 6 Drawing Sheets

(56) References Cited

U.S. PATENT DOCUMENTS

| | | | |
|---|---|---|---|
| 5,661,555 A | * | 8/1997 | Romer et al. .......... 356/139.03 |
| 5,815,269 A | * | 9/1998 | Crabb et al. ................ 356/364 |
| 6,031,613 A | * | 2/2000 | Washington ................ 356/364 |
| 8,797,521 B2 | * | 8/2014 | Mutschler .................... 356/138 |
| 8,890,513 B2 | * | 11/2014 | Basler ..................... 324/207.14 |
| 2010/0118305 A1 | * | 5/2010 | Siraky et al. ................ 356/368 |

* cited by examiner

DEVICE FOR MEASURING THE RELATIVE POSITION OF TWO OBJECTS MOVING IN RELATION TO EACH OTHER

The invention relates to a device for measuring the relative position of two objects moving in relation to each other, in accordance with the preamble of patent claim 1.

Of fundamental important for many applications is the determination of relative position, e.g., the distance between two objects that move relative to each other along an axis, or the rotating angle of an object rotating relative to a stationary object. For example, the rotating object can be the shaft of a motor rotating relative to a stationary machine part. The standard of measurement can be both incremental and absolute, for both linear motion and rotational motion. It is desirable to perform a measurement that is as insensitive as possible to tolerance, but that also has a high degree of accuracy. Ideally, the measurement will occur without contact, in order to avoid mechanical wear. Therefore, optical methods are frequently applied.

To determine the rotating angle of a motor shaft it is known, in particular, to use a contact-free sensor that is based on the polarizing properties of light. Such devices are disclosed by, e.g., DE 100 05 227 A1, DE 201 02 192 U1, EP 2 187 178 A1, EP 1 507 137 A1, and U.S. Pat. No. 7,777,879.

In these devices the light of an unpolarized light sources strikes a polarizer, which ideally polarizes the light in linear fashion and serves as a code disk. The polarized light strikes a receiver, e.g., a photodetector, in front of which another linearly polarizing element is positioned. Depending on the relative angular position of the two polarizing elements, a different luminous intensity appears on the detector. By positioning the polarizer on, e.g., a motor shaft, the rotating angle of this shaft can be determined.

A disadvantage in the use of polarization for measuring the rotating angle of two objects rotating in relation to each other rests in the fact that the rotating angle cannot be measured mechanically for 360°, but only for 180°. Thus an absolute angular signal cannot be determined. To obtain clarity on a relative rotating angle over 360°, and to thereby obtain an absolute angular signal, a solution must sought that simultaneously generates an absolute and an incremental signal, without causing a lost in the signal quality.

The goal of the invention, therefore, is to provide clarity with respect to position for a sensor that determines the relative position of two objects moving in relation to each other, as based on the polarizing properties of light. To the degree possible, the device should succeed without additional detectors or additional plotting algorithms.

The goal of the invention is achieved by a device for measuring the relative position of two objects moving in relation to each other having the features of patent claim 1.

Advantageous embodiments and elaborations of the invention are indicated in the secondary claims.

The device according to the invention for measuring the relative position of two objects moving in relation to each other along an axis or around a rotating axis—with a transmitter which provides unpolarized light; with a polarizer; and with at least one receiver which measure the luminous intensity passing through the polarizer in order to produce a signal that is dependent on position, where a polarizing filter is positioned in front of the receiver and where the receiver and the polarizer move relative to each other as a function of the relative position of the two objects—is characterized by the fact that the polarizer has at least two different directions of polarization. Thus, the rotation of such a polarizer over 360° provides an absolute sinusoidal angular signal with one period per revolution, or a correspondingly modulated signal for motion along an axis. This makes it possible to obtain additional information in the measurement of the relative position of two objects moving in relation to each other, without additional detectors or plotting algorithms. Placing the polarizing filter in front of the receiver means specifically that it is positioned directly in front of the receiver and that no other components are positioned between the polarizing filter and the receiver. The transmitter which emits unpolarized light may be realized by, e.g., an unpolarized light source, such as a light bulb, or also by a polarized light source, e.g., a laser diode with a diffusion disk positioned in front of it. The transmitter advantageously transmits a diverging cone of light in order to illuminate the polarizer in planar fashion.

In one advantageous embodiment of the invention, the optical axis of the transmitter lies parallel to the rotating axis and does not coincide with the rotating axis. This permits the suitable illumination and detection of the asymmetrical design of the polarizer, as based on the two or more different directions of polarization.

According to a preferred embodiment of the invention, the polarizer has a plurality of different polarizing directions and preferably at least 16 different polarizing directions.

According to a particularly preferred embodiment of the invention, the polarizer has at least two areas which have different polarizing directions. These areas border each other and are advantageously designed to interlock in toothed fashion. The discontinuities in the luminous intensity reflected or transmitted by the two areas with different polarizing directions can be mitigated or eliminated by the toothed configuration.

According to a particularly advantageous embodiment, the direction of polarization changes continuously along a path on the polarizer. In this way it is possible to completely eliminate discontinuities in the luminous intensity.

The path will preferably run parallel to the direction of relative motion of the two objects. In particular, the path corresponds to, or run parallel to, the route of the luminous spot produced on the polarizer by the transmitter when there is motion between the polarizer and the receiver.

According to a preferred embodiment, the path corresponds to the route of the luminous spot on the polarizer upon relative motion of the two objects or upon relative motion of the polarizer and the transmitter.

The polarizer is by preference designed as a disk or bar. A disk is used particularly in the case of devices measuring the rotating angle of two objects rotating in relation to each other around an axis of rotation, while a bar is used particularly for devices measuring the relative position of two objects moving in relation to each other along an axis. Here a bar is understood to be a cylindrical element with a cross-sectional area having two parallel edges. Thus a strip or foil, for example, is also understood to be a bar.

The polarizer will preferably be positioned on a surface which is flat or curved.

When the polarizer is designed as a disk, the path will advantageously be a circular orbit around the rotating axis that runs through the disk. When the polarizer is designed as a bar, the path is the shortest connecting line between two points on the opposite ends of the bar. Specifically, the path on the bar is a straight line on one of the two parallel lateral surfaces and runs from one end of the bar to the other.

It is preferred that at least two receivers are provided, with a polarizing filter positioned in front of each of them. Here the two or more polarizing filters have different directions of polarization in order to generate phase-displaced signals and provide redundant signals.

One advantageous embodiment of the invention specifies that the receiver has a greater length tangential to the direction of relative motion of the two objects than perpendicular to the direction of relative motion. This permits the attenuation or elimination of discontinuities in the detected signal, since the detector, specifically in the case of a planar illumination of the polarizer, observes not only the polarizing direction of the axis of illumination, both also observes in proportional fashion the adjacent polarizing directions on the detecting surface, and this leads to a mixture of the detected polarizing directions on the detector surface—which in turn leads to a proportional mixture of the detected luminous intensities. In this way it is possible through optical or spatial interpolation to eliminate the tiered effects in the individual sinusoidal signals.

According to an advantageous embodiment of the invention the length of the receiver tangential to the direction of relative motion is dependent on the speed of the polarizer area that is being observed by the receiver relative to the speed of the receiver itself. This is particularly advantageous in the case of rotating polarizers, so that a detector lying at a greater distance from the rotating axis observes the same angular area as one lying closer to the rotating axis and thus detects light from the identical angular segments of the polarizer. The length of the receiver consequently increases with an increasing distance from the rotating axis.

The receiver preferably has an area that is shaped like a circular segment. This circular surface of the receiver will ideally correspond to the projection onto the receiver of the area illuminated by the transmitter.

In ensure the comparability of the detected signal for different receivers, all receivers will by preference have an equally large surface area.

The invention will next be described in detail on the basis of the following figures. Shown are:

FIG. 7b an enlarged segment from FIG. 7a

In the figures, identical reference symbols designate identical or functionally equivalent parts.

Figure 1:
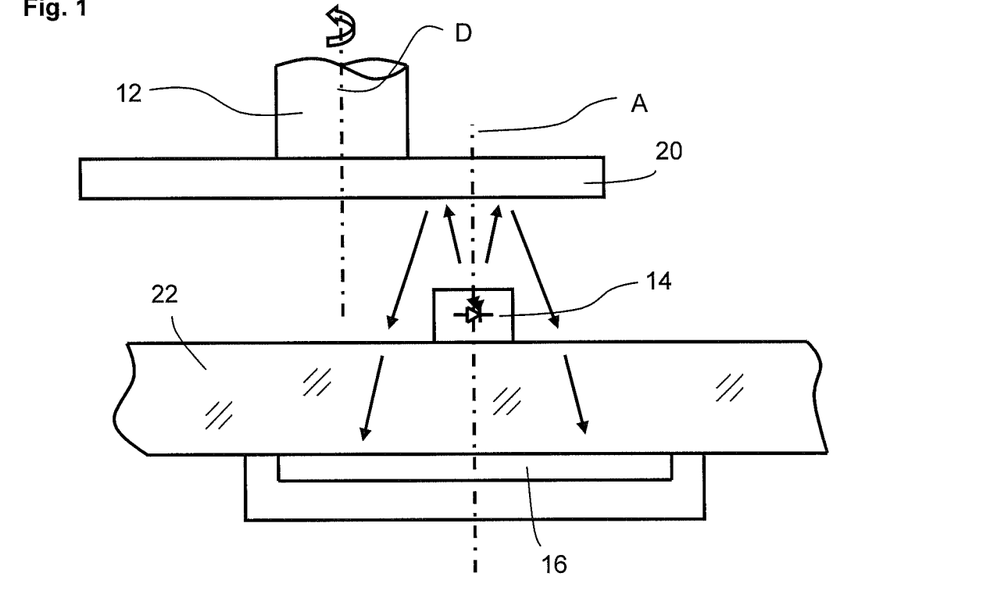
FIG. 1 a schematic depiction of a device for measuring the relative position of two objects rotating relative to each other around a rotating axis according to a first embodiment, in a reflective structure with the transmitter positioned parallel to the rotating axis, such that the transmitter and receiver have the same optical axis FIG. 2 a schematic depiction of a device for measuring the relative position of two objects rotating relative to each other around a rotating axis according to a second embodiment, in a reflective structure with the transmitter positioned parallel to the rotating axis, such that the transmitter and receiver have a different optical axis FIG. 3 a schematic depiction of a device for measuring the relative position of two objects rotating relative to each other around a rotating axis according to a third embodiment, in a transmitting structure with the transmitter positioned parallel to the rotating axis, such that the transmitter and receiver have the same optical axis FIG. 4 a schematic depiction of a device for measuring the relative position of two objects rotating relative to each other around a rotating axis according to a fourth embodiment, in a reflective structure such that the transmitter and receiver have a different optical axis and the optical axis coincides with the rotating axis FIG. 5 a schematic depiction of a device for measuring the relative position of two objects rotating relative to each other around a rotating axis according to a fifth embodiment, in a reflective structure such that the transmitter and receiver have a different optical axis, each running transverse to the rotating axis FIG. 6 a schematic depiction of a polarizer according to a first embodiment, with multiple, specifically, sixteen, segmented areas having different directions of polarization, for use in a device according to one of FIGS. 1 to 5

FIG. 1 provides a schematic depiction of a device 10 for measuring the rotating angle of the objects rotating relative to each other around a rotating axis D, specifically a shaft 12 rotating around the rotating axis D relative to a stationary object. A polarizer 20 is firmly attached to the shaft 12. The polarizer is designed specifically as a disk, for example, a circular disk, and has a normal that runs parallel to the rotating axis D and, in particular, coincides with said rotating axis D.

The polarizer 20 is illuminated by a transmitter 14, specifically a light source. The transmitter 14 has an optical axis A, which in the device 10 according to the exemplary embodiment of FIG. 1 runs parallel to the rotating axis D, but does not coincide with said axis D. The transmitter 14 is designed as an unpolarized light source, e.g., a LED, but can also take the form of a light bulb, or the like. The transmitter 14 will preferably transmit a divergent cone of light to thereby illuminate the polarizer 14 over a large area. By preference, the light cone of the transmitter 14 will be homogeneous. In particular, the intensity profile of the transmitter is rotationally symmetrical, having, e.g., a Lambertian or Gaussian distribution, and will ideally have its intensity of focus on the optical axis A.

The illumination from the transmitter 14 may be collimated or partially convergent. Beamforming is not absolutely necessary for the transmitter. Depending on the embodiment, however, mirror optics, a refractive or diffractive lens, or a combination thereof can be used for the transmitter 14, and here the beamforming has a minimally polarizing effect.

In the device 10 depicted in FIG. 1, the transmitter 14 is positioned on a support element 22, which is transparent in design. The transmitter 14 is positioned on the side of the support element 22 facing the polarizer 20. Positioned on the side of the support element 22 that faces away from the polarizer 20 is a receiver 16, which can take the form of e.g., a detector chip. In this embodiment, the planes of the transmitter 14 and the planes of the receiver 14 thus run parallel to each other. As an alternative, the planes of the transmitter 14 and the planes of the receiver 16 may coincide. In the present embodiment, the optical axis A of the transmitter 14 coincides with the optical axis of the receiver 16. A symmetrical construction of this kind simplifies the evaluating process, but is not absolutely necessary.

The light of the transmitter 14 is polarized by the polarizer 20 and is so reflected that it strikes the receiver 16. Exemplary embodiments of the polarizer 20 and the receiver 16 are described below.

Figure 2:
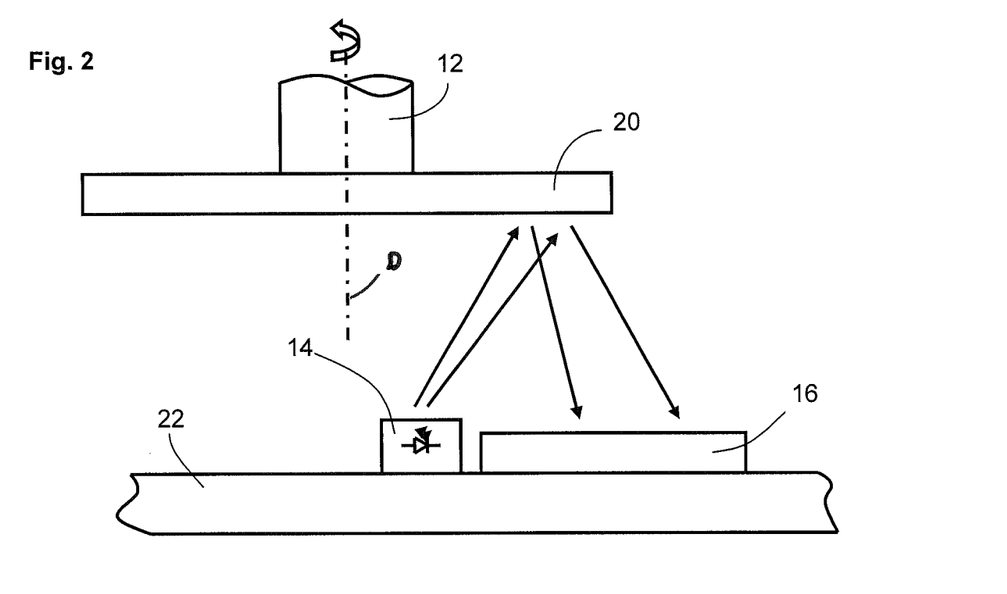

FIG. 2 provides a schematic depiction of another exemplary embodiment of a device 10, which differs from the device shown in FIG. 1 in that the transmitter 14 and the receiver 16 are positioned on one side of the support element, specifically on the side facing the polarizer 20. Thus, the support element 22 need not have a transparent design and can, in particular, take the form of a circuit board. In this embodiment the optical axis of the transmitter 15 does not coincide with the optical axis of the receiver 14.

Figure 3:
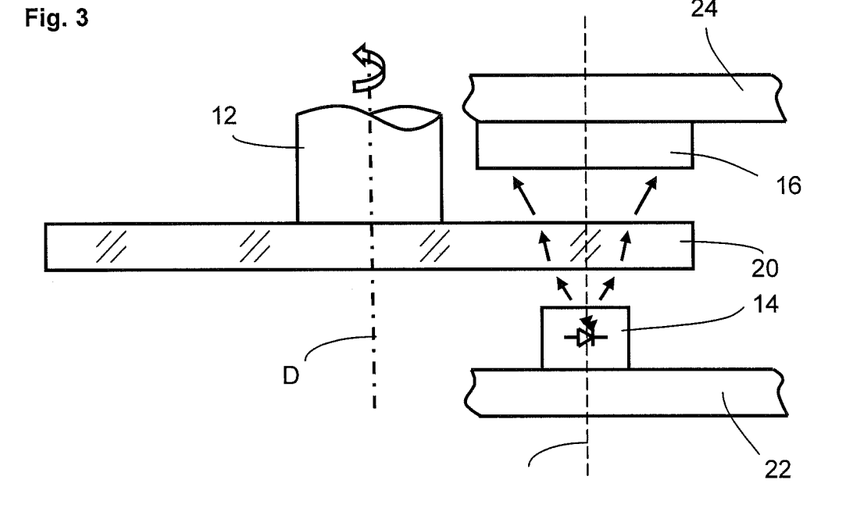

FIG. 3 provides a schematic depiction of another exemplary embodiment of a device 10, which differs from the device shown in FIG. 1 in that the transmitter 14 and the receiver 16 are positioned on two different sides of the polarizer 20. The transmitter 14 may be positioned on a support element 22, which may specifically take the form of a circuit board, while the receiver 16 may be positioned on another support element 24, which may specifically take the form of a circuit board. The optical axis of the transmitter 15 runs parallel to the rotating axis D of the shaft 12. In this embodiment, the optical axis of the receiver 16 coincides with the optical axis A of the transmitter 14. In this embodiment the polarizer 14 has a transmissive design.

Figure 4:
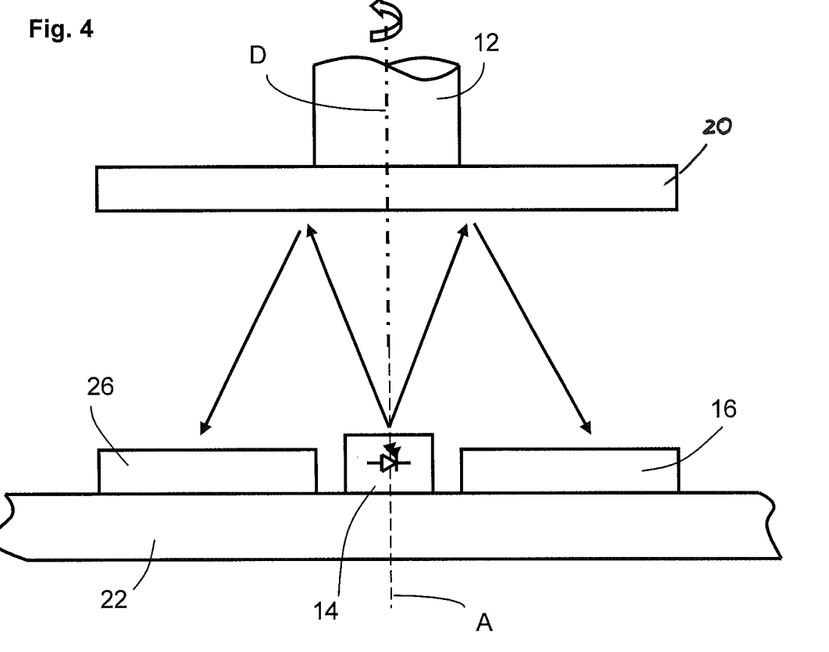

FIG. 4 provides a schematic depiction of another exemplary embodiment of a device 10, in which the optical axis A of the transmitter 14 coincides with the rotating axis D. The transmitter 14 is positioned on the support element 22. In addition to the receiver 16, another receiver 26 is positioned on the support element 22, such that a symmetrical design results. When the device 10 has this kind of design, angular errors caused by eccentricity of the polarizer 20 can be avoided.

Figure 5:
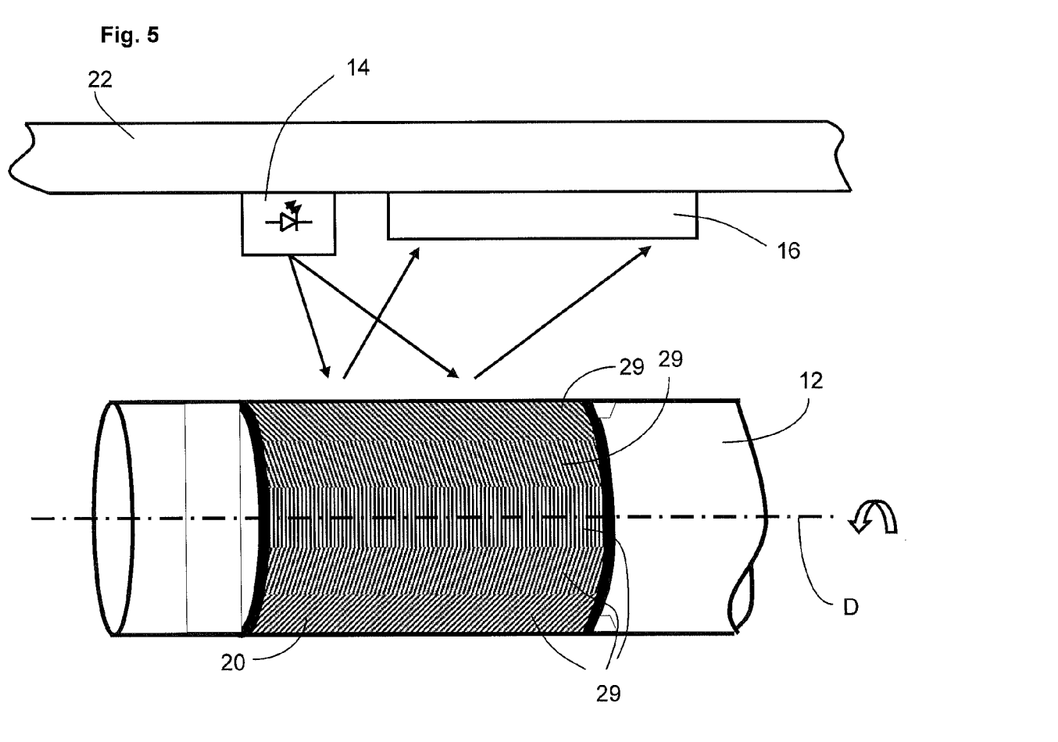

FIG. 5 depicts another exemplary embodiment of a device 10, which differs from the embodiments of FIGS. 1 to 4 in that the polarizer 20 does not take the form of a disk, but rather is coiled around the outer circumference of the shaft 12 in the form of a strip or foil. The polarizer 20 is laterally illuminated by the transmitter 14. In particular, the optical axis A of the transmitter 14 is positioned athwart the rotating axis D. The support element 22 basically runs parallel to the rotating axis D. The receiver 16 is positioned on the support element 22. The support element 22 may take the form of a circuit board.

In principle, it is possible to combine different versions of the transmitter 14, the receiver 16, and the polarizer 20 from the various exemplary embodiments.

The polarizer 20 in the exemplary embodiments according to FIGS. 1, 2, 4, and 5 has a reflective design and can specifically take the form of a reflective mirror. Or it can operate in a diffusely reflective manner. In the exemplary embodiment shown in FIG. 3, the polarizer has a transmissive design.

In principle, a polarizer 20 in the form of a bar is also conceivable, where a bar is understood to be a cylindrical element with a cross-sectional area having two parallel lateral edges, for example, a foil or strip. In the exemplary embodiment of FIG. 5 the bar is wound around the shaft. The bar can also be flat in shape and can serve to determine the relative position of two objects moving relative to each other along an axis.

Figure 6:
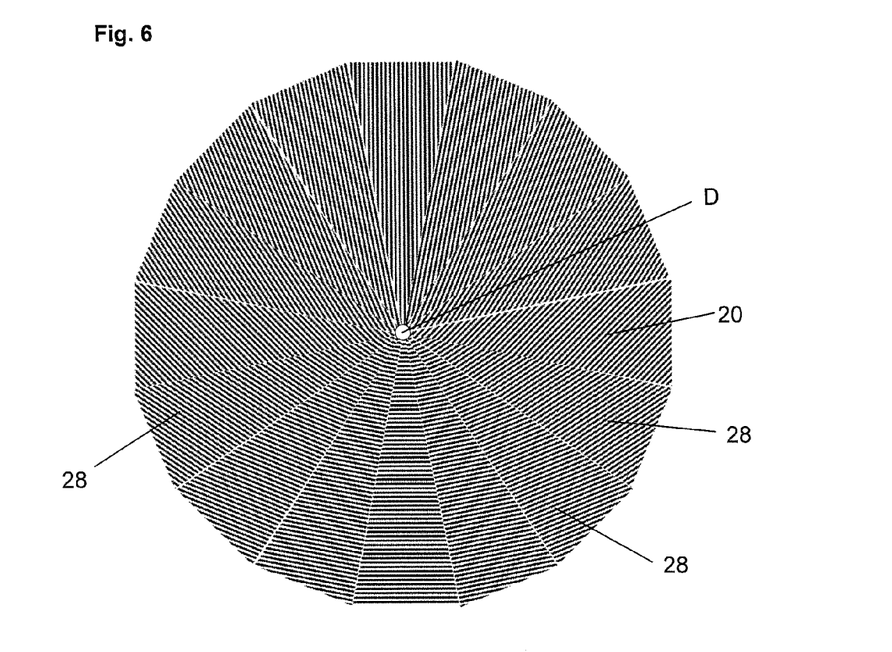

FIG. 6 shows an exemplary embodiment of the polarizer 20, which takes the form of a disk. In particular, the polarizer 20 is mounted on the shaft 12 and rotates with the shaft 12 around the rotating axis D. The polarizer 20 has a plurality of different polarizing directions. In the present embodiment, the different polarizing directions are arranged in various areas 28. In the present case, the areas 28 are approximately triangular in shape. In particular, they have the approximate shape of an isosceles triangle and are arranged so as to border each other, specifically with their sides, and in such a way that they completely cover the disk. The outer shape of the disk is polygonal. Naturally, a round disk with semi-circular areas 28 is also conceivable. And any desired arrangement of the areas 28 on the disk is also possible, including those that only partially cover the disk.

In the present exemplary embodiment, the polarizer 20 has sixteen polarizing directions. In the present exemplary embodiment, the polarizing directions can run from 0° to 168.75° in increments of 11.25°. Naturally it is also possible to arrange identical polarizing directions in the various areas 28, as long as at least two different polarizing directions are present on the polarizer 20. In one embodiment, the areas 28 will ideally be arranged so that the angles of polarization form a series that increases in magnitude over the circumference of the disk.

According to a preferred embodiment of the invention, the polarizing direction changes continuously along a path on the polarizer 20. For example, in the exemplary embodiment shown in FIG. 6 the areas 28 can be infinitesimally narrow in the circumferential direction, with the result that there is a constant change in the polarizing direction between two bordering areas 28 and thus, in particular, the polarizing direction continuously changes along a path on the polarizer 20, which is, e.g., a circular course around the rotating axis D on the polarizer 20.

In particular, the change in the polarizing direction occurs along a path that runs parallel to the direction of motion of the two objects moving in relation to each other. Specifically, the path is the distance covered on the polarizer 20 by the light emitted by the transmitter 13 upon rotation of the polarizer 20 around the rotating axis D. A continuous change in the polarizing direction is desirable along this path in order to avoid discontinuities in the detected luminous intensity.

Figure 7A:
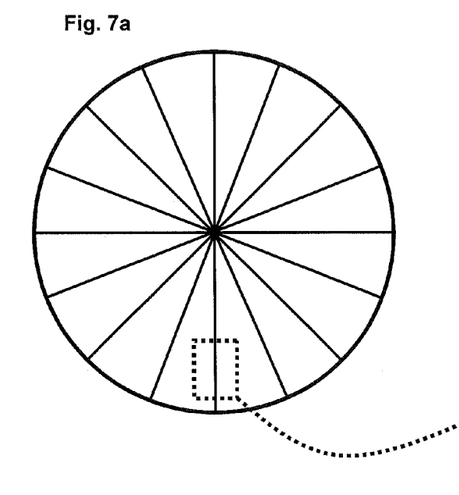
FIG. 7a a schematic depiction of a polarizer according to a second embodiment, with adjacent indented areas, for use in a device according to one of FIGS. 1 to 5
Figure 7B:
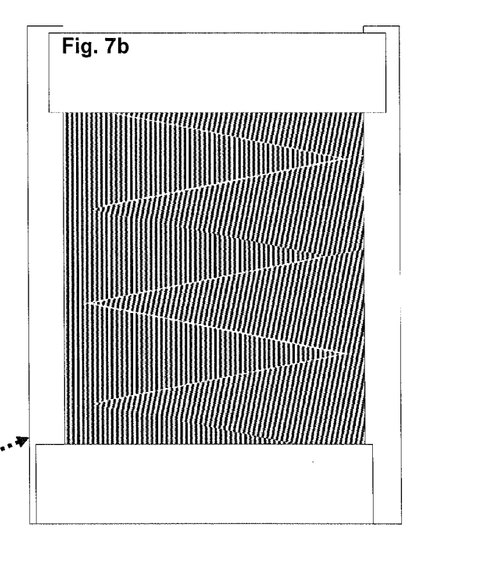

FIGS. 7a and 7b show another exemplary embodiment of the polarizer 20, which differs here from the polarizer of FIG. 6 in that discontinuities in the luminous intensity at the transition between two neighboring areas 28 are mitigated, specifically in that the bordering areas 28, which in the exemplary embodiment of FIG. 6 border each other along a radius, border each other in indented fashion in the exemplary embodiment of FIG. 7. The teeth can be designed, e.g., to be triangular in shape. This results in a quasi-continuous transition between two neighboring areas 28, which—specifically in the case of a planar illumination of the polarizer 20—leads to a quasi-continuous transition in the detected luminosities.

FIG. 5 shows an alternative design of the polarizer 20—not as a disk, but as a rod, with different polarizing directions, and particularly in the form of a strip or foil. The polarizer 20 has rectangular sections 29, which in particular border each other along their longitudinal edges and in such a way that adjacent areas 29 have different polarizing directions. Identical polarizing directions are by preference distributed over the circumference with equal frequency. It is preferred that the difference in the angle of the polarizing directions between two neighboring areas 29 is 180°/n, where n is the number of areas 29. In an undepicted embodiment, the sections 29 can also be designed so as to mesh with each in toothed fashion.

In an exemplary embodiment which is not depicted, the polarizer 20 of FIG. 5 is not wound around the shaft 12, but is positioned on the support element in planar fashion and can be used to determine the relative position of two objects moving in relation to each other along an axis.

Figure 8A:
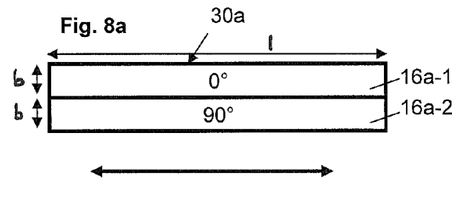
FIG. 8a a schematic depiction of a receiver arrangement according to a first embodiment, with two receivers which have different polarizing directions, for use in a device according to one of FIGS. 1 to 5
Figure 8B:
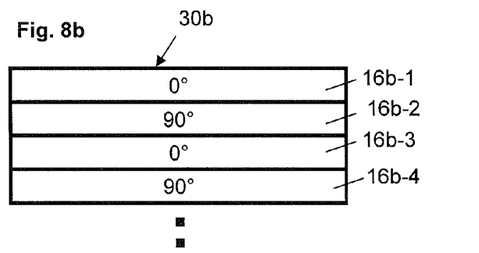
FIG. 8b a schematic depiction of a receiver arrangement according to a second embodiment, with at least four receivers which have two different polarizing directions, for use in a device according to one of FIGS. 1 to 5
Figure 8C:
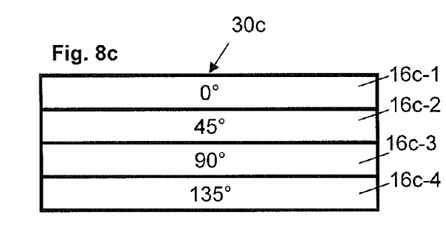
FIG. 8c a schematic depiction of a receiver arrangement according to a third embodiment, with four receivers which have four different polarizing directions, for use in a device according to one of FIGS. 1 to 5
Figure 8D:
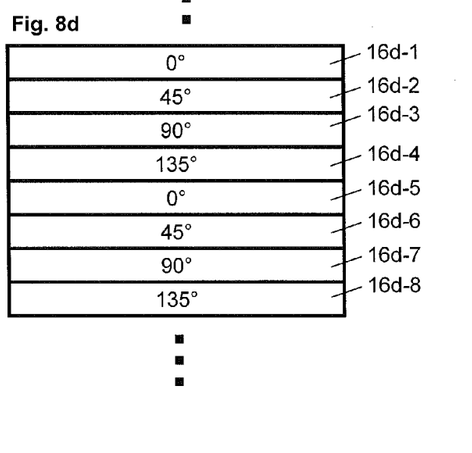
FIG. 8d a schematic depiction of a receiver arrangement according to a fourth embodiment, with at least eight receivers which have four different polarizing directions, for use in a device according to one of FIGS. 1 to 5
Figures 8E, 8F:
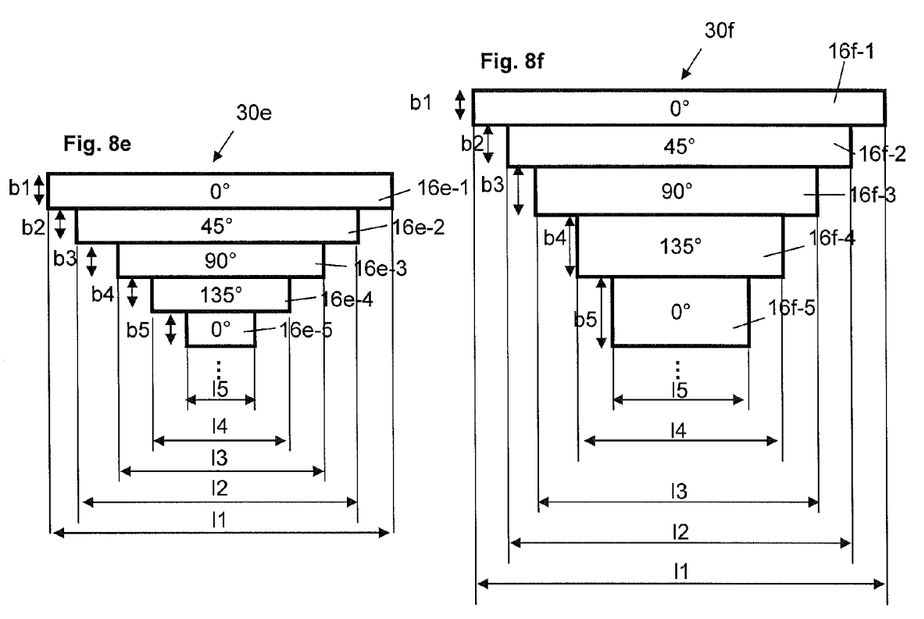
FIG. 8e a schematic depiction of a receiver arrangement according to a fifth embodiment, with at least five receivers of differing length, for use in a device according to one of FIGS. 1 to 5
FIG. 8f a schematic depiction of a receiver arrangement according to a sixth embodiment, with at least five receivers of differing length and differing width, but having the same area, for use in a device according to one of FIGS. 1 to 5
Figure 9A:
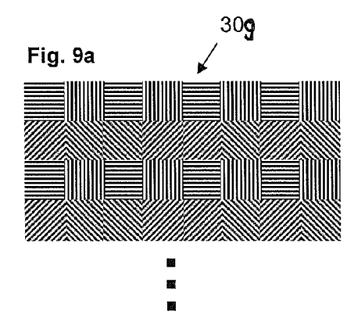
FIG. 9a a schematic depiction of a receiver arrangement according to a seventh embodiment, with a plurality of receivers with different polarizing directions in the longitudinal and transverse directions, for use in a device according to one of FIGS. 1 to 5
Figure 9B:
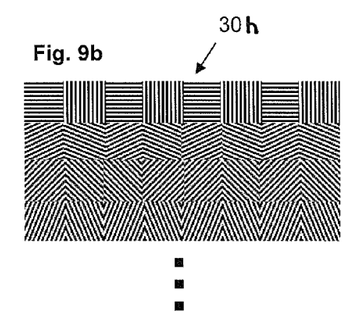
FIG. 9b a schematic depiction of a receiver arrangement according to an eighth embodiment, with a plurality of receivers with different polarizing directions in the longitudinal and transverse directions, for use in a device according to one of FIGS. 1 to 5
Figure 10A:
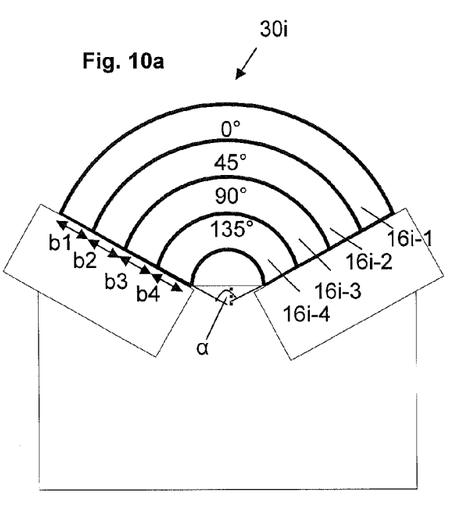
FIG. 10a a schematic depiction of a receiver arrangement according to a ninth embodiment, with at least four receivers in the shape of a circular segment, for use in a device according to one of FIGS. 1 to 5
Figure 10B:
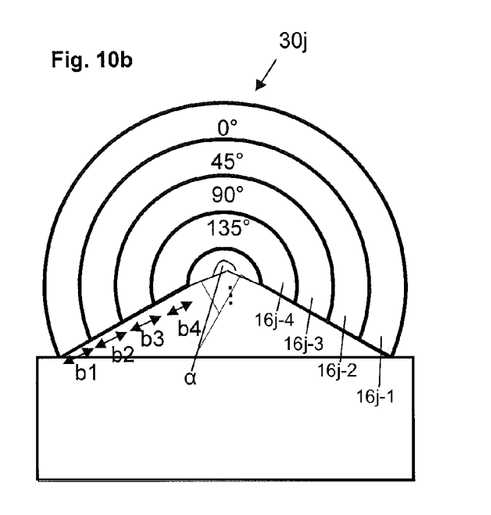
FIG. 10b a schematic depiction of a receiver arrangement according to a tenth embodiment, with at least four receivers in the shape of a circular segment, for use in a device according to one of FIGS. 1 to 5, and FIG. 10c a schematic depiction of a receiver arrangement according to an eleventh embodiment, with at least four receivers in the shape of a circular segment and having differing widths, for use in a device according to one of FIGS. 1 to 5.
Figure 10C:
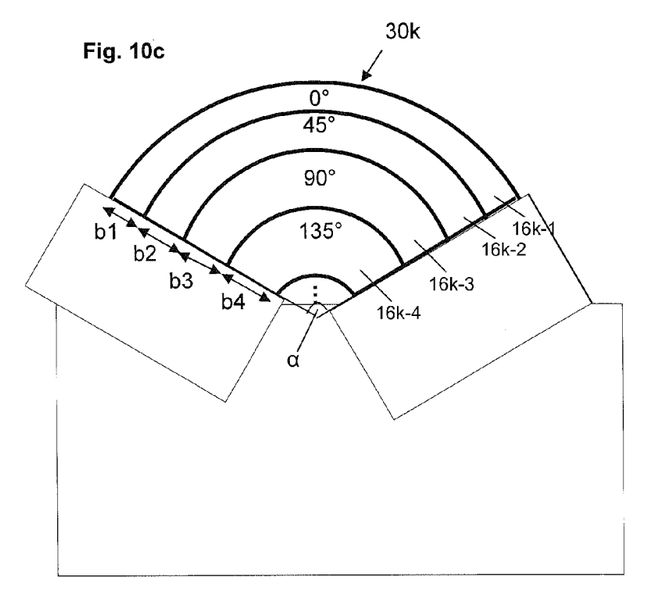

FIGS. 8 to 10 show different realizations of the receiver configurations 30. Basically, a single receiver 16, in front of which is positioned a polarizer filter, is sufficient for the functioning of the device 10. A plurality of receivers 16 can provide redundant signals and improve the angle resolution. Instead of the receiver 16, 26 shown in FIGS. 1 to 5, one of the receiver configurations described below—or one that is comparable—can be used.

FIG. 8a shows an exemplary embodiment of a receiver configuration 30, which has a first receiver 16a-1 and a second receiver 16a-2. The two receivers 16a-1 and 16a-2 have different polarizing directions, e.g., ones that are offset by 90° in relation to each other. Each of the receivers 16a-1, 16a-2 has a length l and a width b, such that the length l and the width b are identical for both receivers 16a-1, 16a-2, and both receivers 16a-1, 16a-2 thus have identical surface area. The length l is considerably greater than the width b. The length l runs tangential to the direction of relative motion of the two objects, or parallel thereto. Because the length l is greater than the width b, and specifically because the length l is tangential to the direction of relative motion of the two objects, a larger area on the polarizer 20 can be detected by each of the receivers 16a-1 and 16a-2—and this results in a mixture of the detected polarizing directions, given an appropriate design of the polarizer 20. This, in turn, results in a proportionate mixture of the detected intensities. Thus, it is possible to avoid discontinuities in the detected luminous intensities. The use of more than one receiver—for example, receivers 16a-1, 16a-2—makes it possible to detect phase-displaced signals and thereby provides an improved angle resolution.

FIG. 8b depicts a receiver arrangement 30b with at least four receivers 16b-1, 16b-2, 16b-3, 16b-4, which each have an identical length l and an identical width b, so that each of the receivers 16b-1, 16b-2, 16b-3, 16b-4 have the same surface area. Every two receivers 16b-1, 16b-3 or 16b-2, 16b-4 have the same polarizing direction. The polarizing directions of the receivers 16b-2, 16b-4 are offset by 90° relative to the polarizing direction of the receivers 16b-1, 16b-3. FIG. 8b indicates by suggestion that more receivers, which are comparable in design to the receivers 16b-1, 16b-2, can, in principle, be present in the receiver arrangement.

FIG. 8c shows a receiver arrangement 30c with at least four receivers 16c-1, 16c-2, 16c-3, 16c-4, which each have the same surface area and the same length l and the same width b, but which have different polarizing directions, specifically polarizing directions of 0°, 45°, and 135°.

FIG. 8d depicts another exemplary embodiment of a receiver arrangement 30d with at least eight receivers 16d-1, 16d-2, 16d-3, 16d-4, 16d-5, 16d-6, 16d-7, 16d-8 which each have the same length l and the same width b and thus have the same surface area. For example, a total of four polarizing directions are present, specifically polarizing directions of 0°, 45°, 90° and 135°, where pairs of receivers 16d-1, 16d-5; 16d-2, 16d-6; 16d-3, 16d-7; 16d-4, 16d-8 each have the same polarizing direction. In principle, other receivers which are comparable in design to receivers 16d-1 to 16d-4 are possible in this arrangement, also.

Specifically in the case of rotating polarizers 20 it is advantageous if the geometry of the receiver surface areas is adapted to the geometry of the polarizer, and specifically to the areas 28, and by preference if it takes into account the fact that areas located further out on the rotating polarizer 20 move more quickly than areas further inwards. In particular, allowance should be made for the fact that when there is a length l tangential to the direction of relative motion of the moving objects, and when length l is identical for all radially adjacent receivers, a falsification of the luminous intensities may result—since averaging is performed over a varying number of areas 28 with different directions of polarization. The receiver arrangement 30e is provided in order to take these considerations into account. This receiver arrangement 30e has at least five receivers 16e-1, 16e-2, 16e-3, 16e-4, 16e-5, each with a length l1, l2, l3, l4, l5 and a width b1, b2, b3, b4, b5. Here the length l1, l2, l3, l4, l5 of the receivers 16e-1, 16e-2, 16e-3, 16e-4, 16e-5 is dependent on the speed with which the area of the polarizer 20 observed by the given receiver 16e-1, 16e-2, 16e-3, 16e-4, 16e-5 moves relative to said receiver 16e-1, 16e-2, 16e-3, 16e-4, 16e-5. In particular, the length l1 of the receiver 16e-1—which receiver, when seen as projected on the polarizer 20, lies at a greater distance from the rotating axis D—is greater than the length l5 of the receiver 16e-5 lying closer to the rotating axis D, as projected on the polarizer.

In the embodiment of the receiver arrangement 30e shown in FIG. 8e, the widths b1 to b5 are identical. As a result, falsifications in the detected intensities may arise. In a receiver arrangement 30f like that in FIG. 8f, consequently—which has a design that is otherwise like that of receiver arrangement 30e—the widths b1, b2, b3, b4, b5 of receivers 16f-1, 16f-2, 16f-3, 16f-4, 16f-5 are designed so that the receivers 16f-1, 16f-2, 16f-3, 16f-4, 16f-5 each have identical surface areas.

An improved adjustment of the geometry of the receivers to the geometry of the polarizer 20 in the determination of the rotating angle of two objects rotating in relation to each other around the rotating axis D can be provided when the receivers 16 are realized as circular segments, as in FIGS. 10a to 10c, rather than as rectangles, as in the exemplary embodiments shown in FIGS. 8a to 8f.

FIG. 10a depicts a receiver arrangement 30i with four receivers of circular shape 16i-1, 16i-2, 16i-3, 16i-4, each of which has a different polarizing direction, for example, 0°, 45°, 90° and 135°. These receivers 16i-1, 16i-2, 16i-3, 16i-4 have the same width b1, b2, b3, b4 and span an identical angle α.

Here it is possible for the angle α to be greater than 180°, as is the case in the exemplary embodiment of a receiver arrangement 30j shown in FIG. 10b, and having receivers 16j-1, 16j-2, 16j-3, 16j-4, which each have the same width b1, b2, b3, b4.

The exemplary embodiment shown in FIG. 10c of a receiver arrangement 30k with receivers 16k-1, 16k-2, 16k-3, 16k-4 differs from the exemplary embodiment shown in FIG. 10 in that the receivers 16k-1, 16k-2, 16k-3, 16k-4 all have the same surface area due to a variation in the widths b1, b2, b3, b4.

FIGS. 9a and 9b depict further exemplary embodiments of receiver arrangements, namely 30g, 30h. These make clear that it is also possible in principle to vary the directions of the polarizing filters positioned in front of the receivers in the direction of length l.

LIST OF REFERENCE NUMERALS 10 device
12 shaft
14 transmitter
16 receiver
20 polarizer
22 support element
24 support element
26 receiver
28 area
29 area
30 receiver arrangement
D rotating axis
A optical axis
X direction of motion
l length
b width

The invention claimed is:

1. Device for measuring the relative position of two objects moving relative to each other along an axis or around a rotating axis (D), with a transmitter (14), which provides unpolarized light, and with a polarizer (20), and with at least one receiver (16) which measures the luminosity of light passing through the polarizer (20) in order to create a position-dependent signal,
wherein,
a polarizing filter is positioned in front of the receiver (16),
the receiver (16) and the polarizer (20) move relative to each other as a function of the relative position of the two objects,
the polarizer (20) has at least two different polarizing directions, and
a length (l) of the at least one receiver (16) tangential to the direction of motion of the two objects is dependent on the speed with which the area of the polarizer (20) observed by the receiver (16) moves relative to the receiver (16).

2. Device according to claim 1,
wherein
the transmitter (14) emits a divergent cone of light.

3. Device according to claim 1,
wherein
the optical axis of the transmitter (14) is positioned parallel to the rotating axis (D) and does not coincide with said rotating axis (D).

4. Device according to claim 1,
wherein
the polarizer (20) has at least sixteen different polarizing directions.

5. Device according to claim 1,
wherein
the polarizer (20) has at least two areas (28, 29) which have different polarizing directions and the at least two areas (28, 29) border each other and are preferably designed to interlock with each other in indented fashion.

6. Device according to claim 1,
wherein
the polarizing direction changes continuously along a path on the polarizer (20).

7. Device according to claim 6,
wherein
the path runs parallel to the direction (X) of the relative motion of the two objects.

8. Device according to claim 1,
wherein
the polarizer (20) is designed as a disk or a bar.

9. Device for measuring the relative position of two objects moving relative to each other along an axis or around a rotating axis (D) comprising a transmitter (14), which provides unpolarized light, a polarizer (20), and at least one receiver (16) which measures the luminosity of light passing through the polarizer (20) in order to create a position-dependent signal,
wherein,
a polarizing filter is positioned in front of the receiver (16),
the receiver (16) and the polarizer (20) move relative to each other as a function of the relative position of the two objects and
the polarizer (20) is positioned on a surface that is curved.

10. Device according to claim 8,
wherein
when the polarizer (20) is designed as a disk, a path on the polarizer (20) takes the form of a circular orbit around the rotating axis (D) of the disk and when the polarizer (20) is designed as a bar, the path takes the form of the shortest connecting line between two points on the opposite ends of the bar.

11. Device according to claim 1,
wherein
at least two receivers (16) are provided, with a polarizer filter positioned in front of each of them, such that the at least two polarizing filters have different polarizing directions.

12. Device according to claim 1,
wherein
the at least one receiver (16) tangential to the direction of motion of the two objects has a length (l) that is greater than the width (b) that is perpendicular to the direction (X) of relative motion.

13. Device for measuring the relative position of two objects moving relative to each other along an axis or around a rotating axis (D), with a transmitter (14), which provides unpolarized light, and with a polarizer (20), and with at least one receiver (16) which measures the luminosity of light passing through the polarizer (20) in order to create a position-dependent signal,
wherein, a polarizing filter is positioned in front of the receiver (16),
the receiver (16) and the polarizer (20) move relative to each other as a function of the relative position of the two objects, and
the polarizer (20) has at least two different polarizing directions and
the receiver (16) has a surface area in the shape of a circular segment.

14. Device according to claim 1,
wherein
all the receivers (16) have a surface area of identical size.

* * * * *